(12) United States Patent
Purdy, Jr. et al.

(10) Patent No.: US 7,522,917 B1
(45) Date of Patent: Apr. 21, 2009

(54) SYSTEM AND METHOD FOR VISUALIZATION OF CONNECTIVITY RELATIONSHIPS IN A WIRELESS SYSTEM

(75) Inventors: Glen L. Purdy, Jr., Snohomish, WA (US); Glenn R. Engel, Snohomish, WA (US); Jerry J. Liu, Sunnyvale, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 590 days.

(21) Appl. No.: 11/223,608

(22) Filed: Sep. 9, 2005

(51) Int. Cl.
*H04Q 7/20* (2006.01)

(52) U.S. Cl. .................... 455/423; 455/566; 455/67.13; 455/422.1; 455/457

(58) Field of Classification Search ............. 455/566, 455/446, 422.1, 423, 404.2, 456.1–457, 447, 455/67.11–67.13; 345/169, 582, 156; 701/1, 701/35, 29; 715/700, 871, 764; 340/825.36, 340/825, 7.2
See application file for complete search history.

(56) References Cited

U.S. PATENT DOCUMENTS

| | | | | |
|---|---|---|---|---|
| 6,665,542 | B1 * | 12/2003 | Clancy | 455/504 |
| 7,076,274 | B2 * | 7/2006 | Jollota et al. | 455/423 |
| 7,209,710 | B2 * | 4/2007 | Burch et al. | 455/423 |
| 7,224,968 | B2 * | 5/2007 | Dobson et al. | 455/423 |
| 7,283,848 | B1 * | 10/2007 | Pfister et al. | 455/566 |
| 7,295,960 | B2 * | 11/2007 | Rappaport et al. | 703/13 |
| 7,363,039 | B2 * | 4/2008 | Laroia et al. | 455/448 |
| 2002/0094782 | A1 * | 7/2002 | Lin | 455/423 |
| 2003/0218994 | A1 | 11/2003 | Caminiti et al. | |
| 2004/0176108 | A1 * | 9/2004 | Misikangas | 455/456.5 |
| 2004/0229623 | A1 * | 11/2004 | Rappaport et al. | 455/446 |
| 2006/0240814 | A1 * | 10/2006 | Cutler | 455/423 |
| 2007/0010259 | A1 * | 1/2007 | Hoffmann | 455/456.1 |

FOREIGN PATENT DOCUMENTS

| | | |
|---|---|---|
| EP | 1210832 | 6/2002 |
| EP | 1210832 B1 | 10/2003 |
| GB | 2327014 | 1/1999 |
| GB | 2386014 | 9/2003 |
| GB | 2423217 | 8/2006 |
| WO | 02 065346 | 8/2002 |

OTHER PUBLICATIONS

GB Search Report Under Section 17 dated Dec. 8, 2006.
German Patent And Trademark Office, office action dated Dec. 18, 2008.

* cited by examiner

*Primary Examiner*—Kamran Afshar

(57) ABSTRACT

A wireless coverage mapping technique is arranged to display the signaling location for each measured signal as well as the measured signal strength. In one embodiment, the resulting map contains a colored circle at the point where the signal measurement is taken and a line connecting the circle to the signaling location in communication with the location of the measurement at the time the measurement is taken. If desired, the color of the line can reflect the connectively metric while the style of the line can convey other information about the measurement or the measurement type. Also, if desired, the direction of movement of a mobile detector (for example, a cellular phone) can be displayed. The map can be used, for example, to determine neighbor lists such that by observation the administrator can match the neighbor list for a particular connection against the transmitter actually selected for that transmission. In this manner, neighbor lists can be updated to reflect the actual usage patterns as shown by the mapping technique disclosed herein.

28 Claims, 1 Drawing Sheet

SYSTEM AND METHOD FOR VISUALIZATION OF CONNECTIVITY RELATIONSHIPS IN A WIRELESS SYSTEM

TECHNICAL FIELD

This invention relates to wireless systems and more particularly to systems and methods for improving visualization of connectivity between wireless devices and wireless transmitters.

BACKGROUND OF THE INVENTION

Wireless communication systems, such as cellular systems, use a large number of transmission sites (in the cellular system these are called base stations) to deliver (and receive) communications between the network and the wireless devices. Such systems are typically divided into cells with each cell formed around a base station. For diagnostic purposes coverage maps are generated to illustrate coverage areas. The coverage information, which is typically a measurement of signal strength or signal quality estimate, is displayed as a pattern of shaded colors (or shaded points) located on a map at the point where the measurement is taken. Over time, the series of shaded colors fills in to illustrate which areas are covered as well as the signal strength at particular locations.

Using such a technique, a network administrator can make determinations as to where additional coverage is required and can improve coverage in areas that have poor (or no) signal coverage. The existing techniques do not, however, allow network administrators to visualize which base stations are serving a particular device location. Thus, when a certain area shows an abundance of red circles (assuming red circles denote poor coverage) the assumption is that transmission from the base station that is designed to cover the "red" sector on the illustrated map must be improved. In fact, that might not be the case at all since the "red" sector might, in fact, be receiving its communications from a different base station.

BRIEF SUMMARY OF THE INVENTION

A wireless coverage mapping technique is arranged to display the base station location for each measured transmission as well as other measurable parameters, such as for example, the measured signal strength. In one embodiment, the resulting map contains a colored circle at the point where the measurement is taken and a line connecting the circle to the transmitter in communication with the location of detector at the time the measurement is taken. If desired, the color of the line can reflect the connectively metric while the style of the line can convey other information about the measurement or the measurement type. Also, if desired, the direction of movement of the mobile station can be displayed.

The map can be used, for example, to determine neighbor lists such that by observation the administrator can match the neighbor list for a particular connection against the transmitter actually selected for that transmission. In this manner, neighbor lists can be updated to reflect the actual usage patterns as shown by the mapping technique disclosed herein.

DETAILED DESCRIPTION OF THE INVENTION

Figure 1:
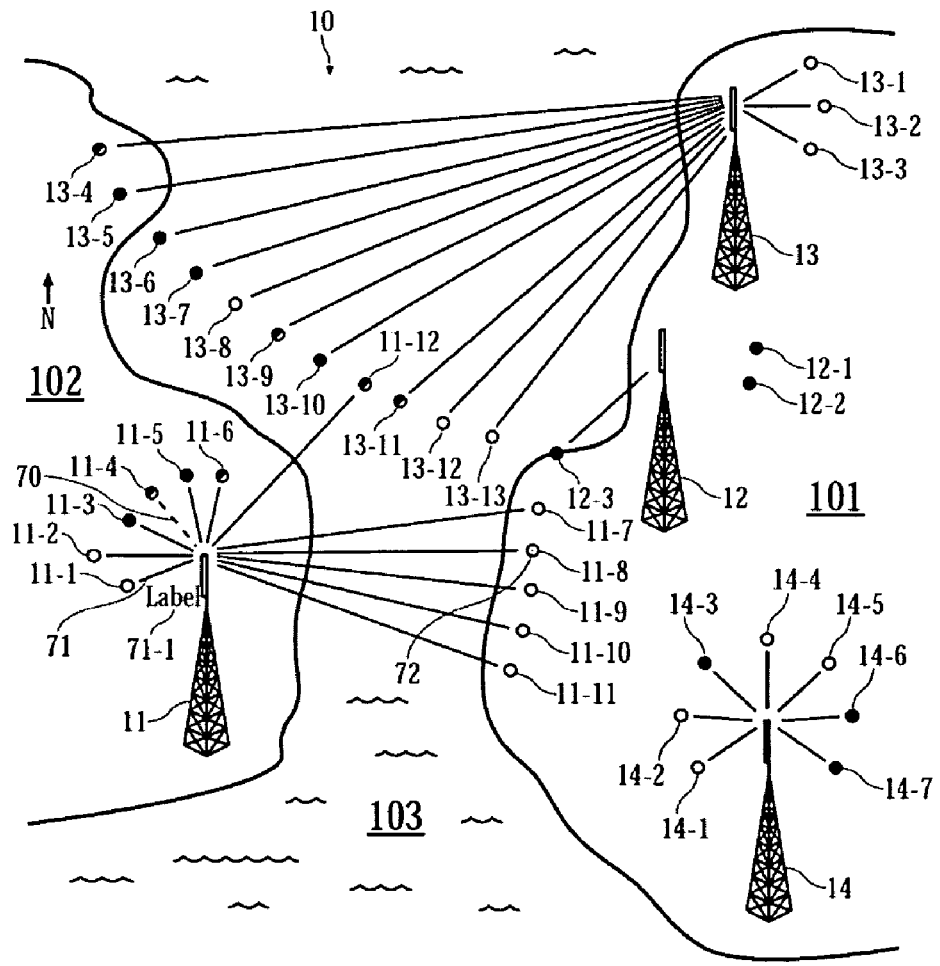
FIG. 1 illustrates one embodiment of a wireless system showing the relationship between each measured device and the transmitter communicating with that device at the time of the measurement.

FIG. 1 illustrates one embodiment 10 of a wireless system showing the relationship between each measured device and the transmitter, such as transmitter 13, communicating with that device at the time of the measurement. While a wireless communication system is shown, the concepts discussed could be used with light transmission whether or not the light is used for communications or simply for visibility purposes.

Figure 2:
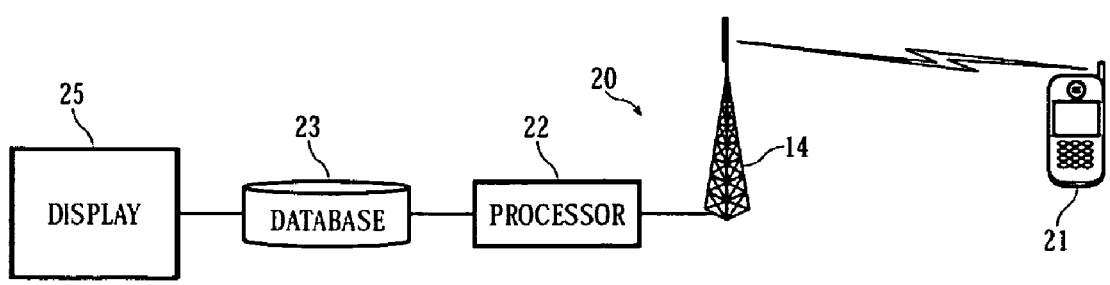
FIG. 2 shows one embodiment of a system for creating the illustration of FIG. 1.

In operation, as shown in FIG. 2, mobile devices, such as device 21, communicates with transmitter 14 which is a sensor (mobile device) reference point. In a cellular system the transmitter would be part of a base station. During the transmission processor 22 connected to the transmitter would from time to time record signal quality, or other parameters, such as data throughput, signal quality, signal loss, light intensity, in database 23. Also stored in database 23 is the location the measurement was taken, the transmitter identity at the time the parameter was measured and, if desired, the direction the mobile device is moving. These measurements are taken with respect to a plurality of mobile devices with respect to a plurality of transmitters, such as transmitters 11-14 as shown in FIG. 1.

Each transmitter could have its own database or multiple transmitters can share a common database. Also, while it is contemplated that a plurality of different mobile devices, such as cell phone would be utilized, the systems and methods discussed herein can be used with a single mobile device moving among a plurality of transmitters. Also, the parameter measurements can be taken by the transmitter, as discussed above, or can be taken by the mobile device(s) and in such a case the processor and database could reside within the mobile device. At some point in time the data stored at the mobile device would be communicated to database 23 or the equivalent.

Returning to FIG. 1, assume that parameter measurements have been gathered pertaining to transmitters 11, 12, 13 and 14. Further, assume that the measurements are each plotted on a map of the area in which the transmitters reside. For purposes of display, these points can be shown as shapes (such as circles, squares, triangles, etc.). Thus, transmitter 11 is shown with points 11-1 through 11-6 all located to the north and west of the transmitter on land mass 103. Points 11-7 through 11-11 also show points where parameter measurements were taken with respect to transmitter 11 on land mass 101. Also, point 11-12 is shown in water 103 associated with transmitter 11. For example, the point 11-4 displays a sensor having a circular shape, with a fill area. In addition, line 70 is a dotted or a dashed line. The width of the line 70 can represent a measurement parameter if required. Line 71 denotes a solid line colored in blue. The width of the line 71 can be of similar or dissimilar thickness to line 70. Label 71-1 identifies a label for line 71. Point 72 includes a direction of travel of the mobile device.

Transmitter 12 is shown with points 12-1 to 12-3 associated therewith. Transmitter 13 has points 13-1 through 13-3 to the northeast and points 13-4 and 13-5 to the west on land mass 102 and points 13-6 through 13-3 on water 103. Transmitter 14 has points 14-1 through 14-7 associated therewith all on land mass 101 As shown, each of these points has an indication, such as a line, connecting the point where the parameter measurement was taken and the transmitter in communication with the device at the time of the measurement. The fill of the circle (or other shape) can be used to indicate the magnitude (or other value) of the measured parameter. Note that in actual practice the names (numbers) of the circles would not be present. Note also that the type of line (said, dashed, dotted, width) and/or the color (including hue, tone, brightness, etc.) can be used to convey information about one or more parameters. Also note that the line need not actually "touch" each end point, but could, for example, be an arrow or partial line.

By observing illustration 10, it is easy to see that while points 11-1 through 11-11 are physically close to transmitter 12 they are, in fact, communicating with transmitter 11 across water 103. Also note that the devices at points 13-6 through 13-13 must be on a boat (or a bridge) across water 103 and communicate with transmitter 13 (except for point 11-12 which communicates with transmitter 11). This is done even though transmitters 11 and 12 would seem to be physically closest to those points. As shown, each point not only indicates, for example, signal strength, but also indicates relationship to a transmitter and, if desired, direction. Thus, simply by observation, one could see transmission patterns and handoff transmitters clearly. This helps in developing neighbor (or hand-off) transmitters since, on paper, a particular transmitter would appear to be the logical choice for a hand-off, the true hand-off might occur to a transmitter located further away.

One measurement parameter is signal strength and, as discussed, another is direction of travel. Other parameters can be, for example, wireless LAN, channel Id, packet loss. Another parameter can be light intensity from a point to an object. This can be useful, for example, to determine visibility of boats as they move around a harbor. Still other parameters could be used to track anything with a moving sensor which is related to a fixed point. One example would be a missile from a launch point or an audio meter to measure sound from a source. The lines drawn on the display begin to resemble a lighthouse for each transmitter and this type of "lighthouse" illustration can be used to display coverage relationships in a wide variety of wireless systems, such as cellular, LAN, 802.11, Wi-Fi and 802.16 WiMAX wireless LAN systems. The system could be used for TV signals from a transmitter showing coverage area.

FIG. 2 shows one embodiment 20 of a system for creating the illustration of FIG. 1. In the embodiment, transmitter 14 is shown communicating with cellular phone 21. The signal strength is, for example, calculated by the processor (not shown) in phone 21 and communicated to database 23 via processor 22 along with the location as obtained by GPS or other methods. Note that the signal strength (or other measured parameters) readings could be maintained in phone 21 and downloaded from time to time to database 23 which could be associated with a single transmitter or stand-alone. Note that in the embodiment discussed with respect to FIG. 2, phone 21 would become one of the circles labeled 14-1 to 14-7 (FIG. 1).

FIG. 2 also identifies a display 25 for locating points were the quality parameters were measured, each point displaying a representation of the measured parameter as well as an indication of which transmitter was involved in the measured parameter.

While the discussion has focused on sensors moving in a plane (2 dimensional) the concepts discussed herein can be used with 3-dimensional sensors and would, for example, be displayed in a 3-D manner using a holographic display.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for mapping relationships between a plurality of mobile sensors and a plurality of sensor reference points, said method comprising:
   obtaining measured parameters at said sensors;
   each said measured parameter comprising in addition to the parameter being measured,
   the identity of the sensor reference point from which said measured parameter is being transmitted at the time said measured parameter is obtained; and
   displaying said measured parameter for each said sensor as a line connecting said sensor with said sensor reference point corresponding to said measured parameter.

2. The method of claim 1 wherein the graphical characteristics of said line reflect at least one aspect of said measured parameter.

3. The method of claim 2 wherein said graphical characteristics are selected from one or more characteristics from the list of: solid line, dotted line, labeled line, dashed line, colored line, width of line.

4. The method of claim 2 wherein said measured parameters reflected by said line are selected from the list of: data throughput, signal quality, signal loss, light intensity.

5. A method for mapping wireless communication coverage areas, said method comprising:
   obtaining a measured parameter of transmission quality from a plurality of wireless devices, each said transmission quality measured parameter pertaining to a wireless device at a particular physical location and each said measured parameter comprising, in addition to the measured parameter, the identity of the transmitter communicating with said wireless device at the time said measured parameter is obtained; and
   positioning on a map of the physical area over which said transmission quality was measured said obtained measured parameters as a series of points, each point located at the physical location where said measured parameter was obtained and each point displaying the identity of the transmitter from which said parameter was measured.

6. The method of claim 5 wherein said point display of transmitter identity is a line drawn from said point to said identified transmitter.

7. The method of claim 6 wherein the graphical characteristics of each said line reflect information pertaining to said measured parameter.

8. The method of claim 7 wherein said graphical characteristics are selected from one or more characteristics from the list of: solid line, dotted line, labeled line, dashed line, colored line, width of line.

9. The method of claim 7 wherein said measured parameters reflected by said line are selected from one or more characteristics from the list of: data throughput, signal quality, signal loss, light intensity.

10. The method of claim 6 wherein the graphical characteristics of at least some of said points reflect information pertaining to said measured parameter at said point.

11. The method of claim 9 wherein said graphical characteristics are selected from one or more characteristics from the list of: color, shape, shape fill, width of line.

12. The method of claim 5 wherein said wireless system is a cellular system and wherein said transmission points are base stations.

13. A system for displaying transmission characteristics in a wireless network, said system comprising:
   a plurality of transmitters for communicating with mobile devices;
   at least one measuring device for determining transmission quality parameters associated from time to time between said devices and said transmitters; and
   a display for locating thereon points where said quality parameters were measured, each said point displaying at said point a representation of the measured parameter as well as an indication of which transmitter was involved in said measured parameter at the time said measured parameter is obtained.

14. The system of claim 13 wherein said indication is a line between said point and said involved transmitter.

15. The system of claim 14 wherein said point displays said parameter by one or more of the following: shape of said point on said display, fill area of said point, color of said point, width of line.

16. The system of claim 14 wherein said line has characteristics that indicate information pertaining to said measurement.

17. The system of claim 16 wherein said characteristics are selected from one or more characteristics from the list of: solid line, dotted line, labeled line, dashed line, colored line, width of line.

18. The system of claim 14 wherein said point includes a direction of travel of said mobile device represented by said point.

19. A system for mapping wireless communication coverage areas, said system comprising:
   means for obtaining a measured parameter of transmission quality from a plurality of wireless devices, each said transmission quality measured parameter pertaining to a wireless device at a particular physical location and each said measured parameter comprising, in addition to the measured parameter, the identity of the transmitter communicating with said wireless device at the time said measured parameter is obtained; and
   means for positioning on a map of the physical area over which said transmission quality was measured said obtained measured parameters as a series of points, each point located at the physical location where said measured parameter was obtained and each point displaying the identity of the transmitter from which said parameter was measured.

20. The system of claim 19 wherein said point display of transmitter identity is a line drawn from said point to said identified transmitter.

21. The system of claim 20 wherein the graphical characteristics of each said line reflect information pertaining to said measured parameter.

22. The system of claim 19 wherein the graphical characteristics of at least some of said points reflect information pertaining to said measured parameter at said point.

23. A computer product, said computer product containing machine readable code for controlling a diagnostic display for a cellular communication system, said computer product comprising:
   code for controlling the determination of transmission quality parameters between mobile devices and base stations; and
   code for controlling the display of determined ones of said quality parameters, said display being a series of points representing the location of each determined transmission quality and each representing a measured parameter as well as an indication of which transmitter was involved in said measured parameter at the time said parameter is obtained.

24. The computer product of claim 23 wherein said indication is a line between said point and said involved transmitter.

25. The computer product of claim 24 wherein said point displays said parameter by one or more of the following: shape of said point on said display, fill area of said point, color of said point, width of line.

26. The computer product of claim 24 wherein said line has characteristics that indicate information pertaining to said measurement.

27. The computer product of claim 26 wherein said characteristics are selected from one or more characteristics from the list of: solid line, dotted line, labeled line, dashed line, colored line, width of line.

28. The computer product of claim 24 wherein said point includes a direction of travel of said mobile device represented by said point.

* * * * *